United States Patent [19]
Kishi

[11] 4,022,401
[45] May 10, 1977

[54] TAPE CASSETTE

[75] Inventor: Yoshio Kishi, Tokyo, Japan

[73] Assignee: Sony Corporation, Tokyo, Japan

[22] Filed: Mar. 23, 1976

[21] Appl. No.: 669,651

Related U.S. Application Data

[63] Continuation of Ser. No. 642,113, Dec. 18, 1975, abandoned.

[30] Foreign Application Priority Data

Dec. 24, 1974 Japan ................................ 50-135
Apr. 8, 1975 Japan ............................ 50-42526

[52] U.S. Cl. ............................................. 242/198
[51] Int. Cl.² ....................................... G11B 23/10
[58] Field of Search .......... 242/198, 199, 200, 197, 242/55.19 A, 71.2, 71.1; 360/96, 93

[56] References Cited
UNITED STATES PATENTS

| | | | |
|---|---|---|---|
| 2,584,733 | 2/1952 | Owens | 242/198 |
| 3,059,871 | 10/1962 | Loewe | 242/198 |
| 3,672,603 | 6/1972 | Swain | 242/198 |
| 3,684,295 | 8/1972 | Strain et al. | 242/198 |
| 3,800,322 | 3/1974 | Schoettle | 242/198 |

*Primary Examiner*—George F. Mautz
*Attorney, Agent, or Firm*—Lewis H. Eslinger; Alvin Sinderbrand

[57] ABSTRACT

A tape cassette having supply and takeup reels rotatably disposed in a housing and a supply of tape wound on the reels and extending between the latter, is provided with a brake assembly which is engaged when the cassette is not in use, and which is operative in such engaged condition to securely hold the reels against rotation in the directions for unwinding the tape therefrom, while permitting substantially free rotation of each reel independently of the other in the direction for rewinding the tape on the reel.

19 Claims, 8 Drawing Figures

TAPE CASSETTE

This is a continuation of Ser. No. 642,113 filed Dec. 18, 1975, now abandoned.

BACKGROUND OF THE INVENTION

1. Field of the Invention

This invention relates generally to tape cassettes, and more particularly is directed to improvements in magnetic tape cassettes provided with reel brake assemblies which are engaged or operative when the cassette is not in use.

2. Description of the Prior Art

Recently, it has been proposed to provide an improved cassette recording and/or reproducing apparatus in which a magnetic tape extending between supply and takeup reels contained in a cassette housing may be withdrawn from the housing for the high quality recording and reproducing of information signals on the tape. Generally, the tape cassette provided for use in such an apparatus has a relatively large opening in the peripheral wall of the cassette housing to permit the magnetic tape to be withdrawn therethrough. Therefore, if the magnetic tape is loosened, as by turning of one or both of the reels in the direction for unwinding the tape therefrom while the cassette is not in use, there is the danger that the loosened tape may inadvertently exit from the housing through the large opening of the latter and thus be susceptible to being damaged or even severed. Even if the loosened tape does not exit from the cassette housing, it is possible that the loosened tape within the housing will not be positioned so as to make possible its controlled withdrawal from the cassette housing when the cassette is subsequently installed on the recording and/or reproducing apparatus.

Various tape cassettes have been proposed in which braking means are provided within the cassette housing to resist unwinding or loosening of the tape when the cassette is not in use. In some of these known tape cassettes, for example, as disclosed in U.S. Pat. No. 3,027,111, a braking member having serrated, converging side edges is movable longitudinally between the supply and takeup reels and is urged by a spring to move in the direction in which such side edges converge so as to engage the serrated side edges with the wheel hubs. A projection extends longitudinally from the braking member and is exposed at an opening of the cassette housing so as to be actuable for moving the braking member in the opposite longitudinal direction and thereby freeing the reels for rotation when the cassette is installed in a recording and/or reproducing apparatus. The foregoing tape cassette is disadvantageous in that, when the cassette is removed from the recording and/or reproducing apparatus to permit the spring to return the braking member longitudinally to its engaged position, the serrated edges of the braking member act, in the course of such return movement, to impart incremental rotary movements to the reels in the tape-unwinding direction with the result that the tape extending between the reels is loosened to some extent. Further, if loosening of the tape has occurred, the manual rotation of a reel in the direction for rewinding the tape thereon and removing the slack from the tape has to be effected against the relatively large frictional resistance of the engaged braking member under the urging of the spring acting thereon.

In another similar proposed tape cassette provided with braking means, for example, as specifically disclosed in U.S. Pat. No. 3,800,322, supply and takeup reels on which the tape is wound are rotatably mounted in side-by-side relation within the cassette housing, and such reels are provided with inclined serrations in the peripheries of their flanges. A wedge-shaped locking or brake member formed with serrations on the opposite sides thereof is situated between the flanges of the reels and is urged by a spring to move in the direction for engaging the serrations of the locking or brake member with the serrated peripheries of the reel flanges, whereby to hold the reels against rotation in the direction for unwinding the tape therefrom. When such tape cassette is installed in a recording and/or reproducing apparatus, an actuating pin or member of such apparatus enters the cassette housing and acts on the wedge-shaped locking or brake member so as to displace the latter against the spring force, that is, in the direction for removing the serrated side edges of the locking or brake member from the serrated peripheries of the reel flanges, whereupon the reels are free to be rotated. When the tape cassette is removed from the recording and/or reproducing apparatus, the locking or brake member is returned to its operative or engaged position by the associated spring, and such return movement again imparts rotary movements to the reels in the tape-unwinding direction so that the tape is loosened. If the serrations provided on the reel flanges and on the wedge-shaped locking or brake member are suitably inclined, the reels may be manually turned in the direction to rewind the tape thereon even when the locking or brake member is in its engaged position but such turning of the reels has to be effected against the resistance of the spring acting on the wedge-shaped locking or brake member, and such spring desirably exerts a substantial force in order to ensure the retention of the locking or brake member in its engaged position when the cassette is not in use.

In still another proposed braking means associated with an endless tape cartridge, for example, as specifically disclosed in U.S. Pat. No. 3,637,152, a flange of the reel is formed with serrations that are inclined to the radii of the reel, and a locking lever pivotally mounted intermediate its ends within the cartridge housing is formed with a hooked end and is spring urged to pivot in the direction moving the hooked end against the serrated periphery of the reel flange. The opposite end of the locking lever is pivotally connected to an actuating slide which is exposed at an opening of the cartridge housing. When the cartridge is inserted in a reproducing or playback apparatus, the magnetic head of such apparatus displaces the actuating slide so as to pivot the locking lever in the direction moving its hooked end away from the serrated periphery of the reel flange so as to free the reel for rotation. Upon the removal of the cartridge from the playback apparatus, the spring acting on the locking lever returns the latter to its operative position in which the hook engages in an inclined serration of the reel flange for locking the latter against rotation in one direction. Although the inclination of the serrations permits the reel to be manually turned in the opposite direction even when the cartridge is not in use, it will be apparent that such turning of the reel is relatively strongly resisted by the appreciable spring force acting on the locking lever to ensure its return movement to the operative position thereof when the cassette is removed from the playback apparatus.

OBJECTS AND SUMMARY OF THE INVENTION

Accordingly, it is an object of this invention to provide a tape cassette with braking means which avoid the above mentioned disadvantages of the existing tape cassettes.

More specifically, it is an object of this invention to provide a tape cassette with braking means which, when the cassette is not in use, securely holds or locks each reel against rotation in the tape unwinding direction, while permitting substantially free rotation of each reel in the rewinding direction so that any looseness occurring in the tape can be conveniently removed or taken up.

Another object is to provide braking means, as aforesaid, for take-up and supply reels rotatably disposed in a cassette housing, and in which such braking means is arranged to conveniently release both reels for rotation when the cassette is installed in a recording and/or reproducing apparatus.

Still another object is to provide braking means, as aforesaid, which permits substantially free rotation in the tape rewinding direction of either the takeup reel or the supply reel independently of the other when the cassette is not in use.

A further object is to provide braking means, as aforesaid, in which the major components thereof are susceptible to being produced as integral parts of a molded plastic element so as to simplify and reduce the costs of the production and assembly of such braking means.

In accordance with an aspect of this invention, each reel rotatably disposed in the housing of a tape cassette is provided with a circular series of raked teeth which define respective substantially radially directed surfaces facing in the direction of rotation of such reel for unwinding tape therefrom, and the braking means for each reel includes a support member, preferably in the form of a pivoted lever, movable in the cassette housing between an engaged position and a disengaged position, a pawl-like member carried by the support member to be positioned against the raked teeth of the respective reel in the engaged position of the support member and being spaced from the raked teeth in the disengaged position, means mounting the pawl-like member for angular displacement in respect to the support member so that, with the latter in its engaged position, rotation of the reel in the direction for rewinding the tape thereon causes the raked teeth to move past the pawl-like member as the latter is angularly displaced in one direction relative to its support member so as to substantially free the reel for rotation in the tape rewinding direction, whereas rotation of the reel in the tape unwinding direction brings one of the substantially radially directed surfaces of the raked teeth against the pawl-like member so as to urge the latter to be angularly displaced in the opposite direction relative to its support member, and abutment means preferably fixed in respect to the cassette housing and being engageable by the pawl-like member in the engaged position of its support member for blocking the angular displacement of the pawl-like member in said opposite direction relative to its support member, thereby to prevent the unwinding of the tape from the associated reel.

In a preferred embodiment of the invention, each support member, in the form of a pivoted lever, and the respective pawl-like member are integral parts of a one-piece molded plastic element, while the means mounting each pawl-like member on the respective support membeer is constituted by a web-like part of the one-piece molded plastic element and such web-like part is relatively thin so as to be resiliently flexible.

Further, when the invention is applied to a tape cassette having supply and takeup reels arranged in side-by-side relation within the cassette housing, the support levers of the braking means for such supply and takeup reels extend laterally in the cassette housing behind the respective reels and have the web-like parts which mount the pawl-like members directed forwardly from the laterally outer ends of the support levers, while the laterally inner ends of the support levers are coupled together and exposed at an opening of the cassette housing so as to be jointly actuated for moving the support levers to the disengaged positions thereof.

The above, and other objects, features and advantages of this invention, will be apparent in the following detailed description of an illustrative embodiment which is to be read in connection with the accompanying drawings.

DESCRIPTION OF A PREFERRED EMBODIMENT

Figure 1:
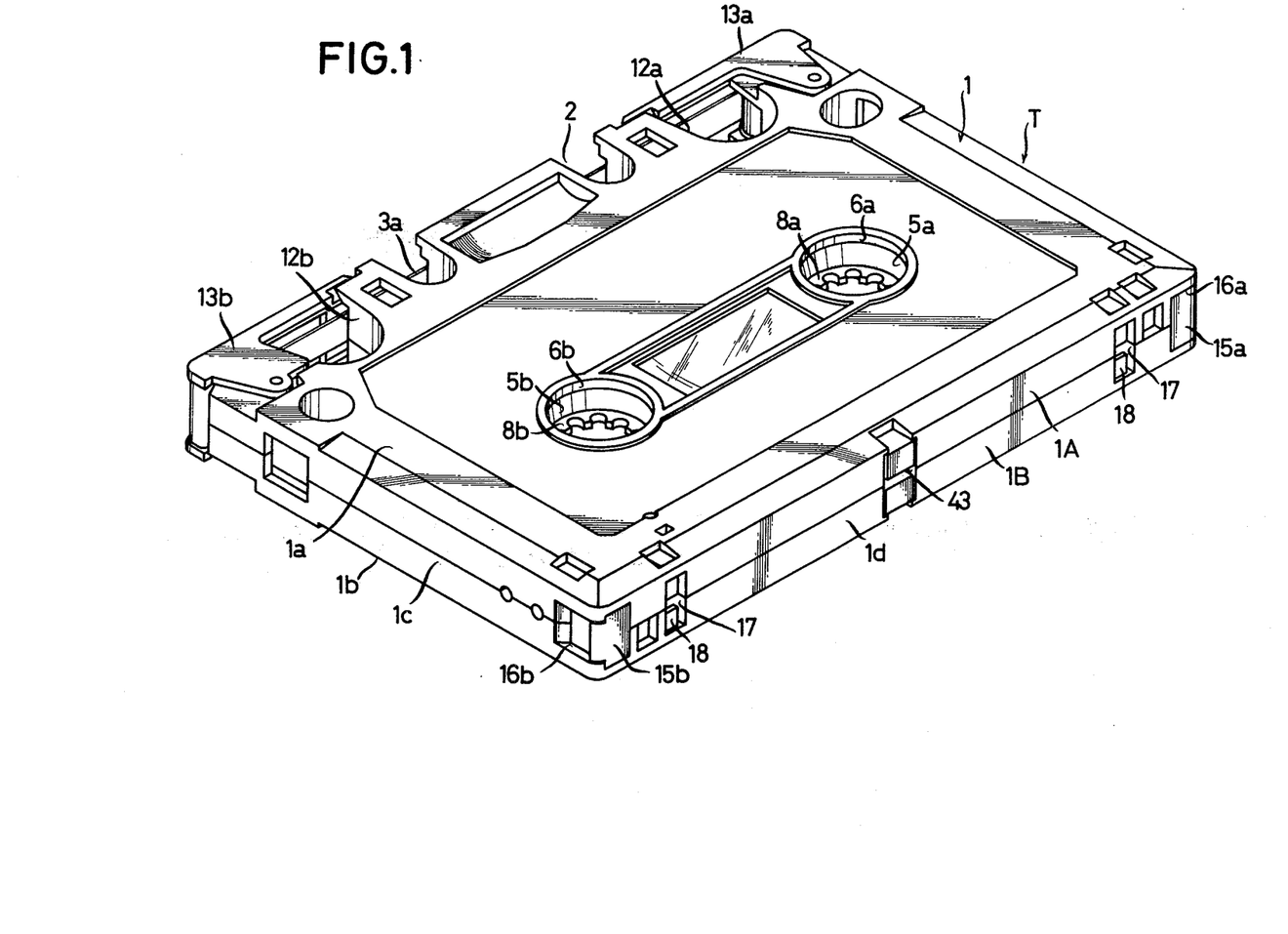
FIG. 1 is a perspective view of a tape cassette in accordance with one embodiment of this invention, and in which the tape cassette is viewed from the back side thereof.
Figure 2:
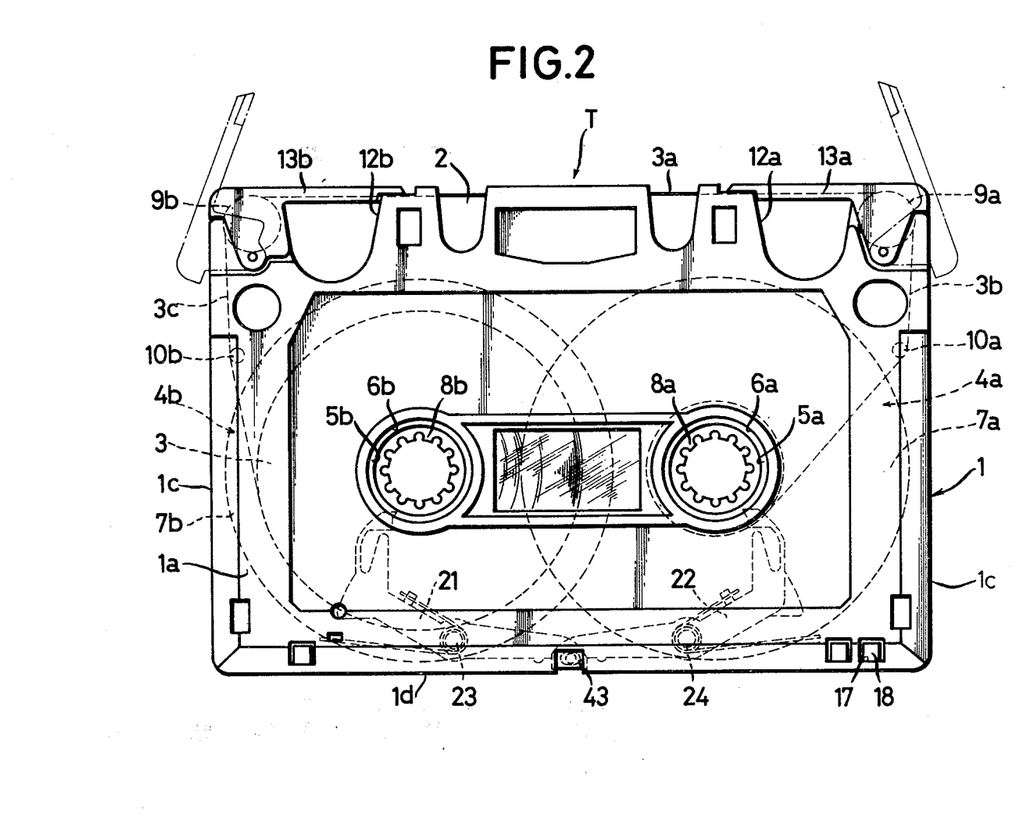
FIG. 2 is a top plan view of the tape cassette of FIG. 1.

Referring to the drawings in detail, and initially to FIGS. 1 and 2 thereof, it will be seen that a tape cassette T according to an embodiment of this invention generally comprises a substantially rectangular cassette housing 1 formed of mating, molded plastic upper and lower sections 1A and 1B which are suitably secured together, for example, by screws (not shown). The housing sections 1A and 1B are respectively constituted by top and bottom walls 1a and 1b having peripheral flanges extending along one of the relatively long sides and both of the relatively short sides of the rectangular housing 1 for defining peripheral walls, specifically, side walls 1c and a back wall 1d. Since the peripheral walls extend along only three of the sides of rectangular housing 1, an opening 2 is defined between top and bottom walls 1a and 1b along the fourth relatively long side of the housing.

Figure 3:
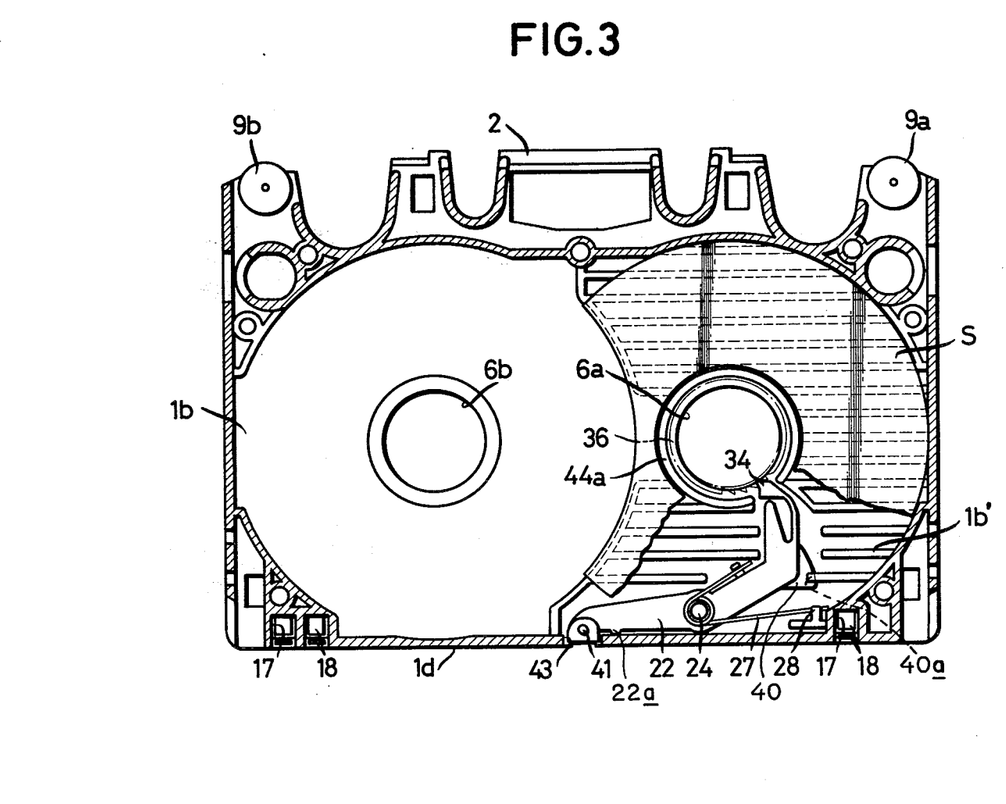
FIG. 3 is a top plan view similar to that of FIG. 2, but in which an upper section and supply and takeup reels of the cassette are removed.
Figure 4:
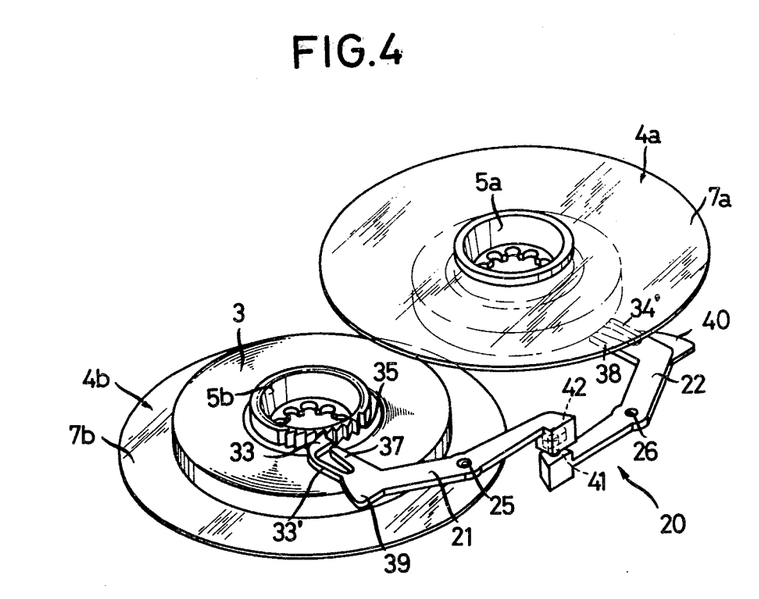
FIG. 4 is a persepective view of the reels and braking means provided in the tape cassette of FIG. 1.

As shown particularly on FIGS. 1, 2 and 4, a supply of tape 3 is contained in housing 1 and is wound on supply and takeup reels 4a and 4b. As shown, supply reel 4a may include a cylindrical hub 5a which, at its upper and lower ends, is loosely and rotatably guided in circular holes 6a provided in the top and bottom walls of housing 1. An upper flange 7a extends radially outward from hub 5a under the top wall 1a of housing 1. The inner surface of hub 5a is formed with a plurality of circumferentially spaced apart, axial projections or splines 8a for rotatable coupling of supply reel 4a with a respective reel drive shaft or spindle (not shown) of a tape recording and/or reproducing apparatus. The takeup reel 4b may similarly include a cylindrical hub 5b which, at its upper and lower ends, is loosely and rotatably guided in circular holes 6b in top and bottom walls 1a and 1b, and a lower flange 7b extending radially outward from hub 5b above bottom wall 1b. The inner surface of hub 5b is also shown to be formed with a plurality of circumferentially spaced, axial projections or splines 8b for rotatable coupling of takeup reel 4b with a respective reel drive shaft or spindle (not shown) of the tape recording and/or reproducing apparatus. As shown, reels 4a and 4b are disposed in side-by-side relation with the upper flange 7a of reel 4a overlapping or overlying a portion of the lower flange 7b of reel 4b. Since the reels 4a and 4b each have only a single flange 7a or 7b for guiding the tape 3 wound thereon, the upper surface of bottom wall 1b of the cassette housing has a raised portion 1b' formed by a plurality of ribs (FIG. 3) at the region corresponding to supply reel 4a, and such raised portion 1b' is covered with a layer S of low friction material, such as, a sheet of polytetrafluoroethylene or the like, which acts as a low-friction guide for the lower edge of the tape 3 wound on supply reel 4a. Similarly, though not shown on the drawings, top wall 1a of the cassette housing has a downwardly thickened portion formed by a plurality of ribs at the region thereof corresponding to takeup reel 4b, and the undersurface of such thickened portion is covered by a layer of low-friction material for guiding the upper edge of the tape wound on takeup reel 4b.

The cassette T is also shown to be provided with guide rollers 9a and 9b (FIGS. 2 and 3) which are rotatably mounted on pins extending between top and bottom walls 1a and 1b at the corners of housing 1 which are at the opposite ends of opening 2 for guiding tape 3 between reels 4a and 4b in a run 3a extending along the fourth or open long side of the cassette housing. Further, guide pins 10a and 10b project upwardly from bottom wall 1b adjacent the opposite, relatively short side walls 1c of rectangular housing 1 and engage the tape between reel 4a and guide roller 9a and between reel 4b and guide roller 9b, respectively. Thus guide pins 10a and 10b direct the tape between reels 4a and 4b and the adjacent ends of run 3a in paths 3b and 3c (FIG. 2) that are respectively adjacent the opposed relatively short side walls 1c of the housing.

Further, top and bottom walls 1a and 1b may be provided with pairs of aligned, generally U-shaped cutouts 12a and 12b which communicate with opening 2, and which are symmetrically disposed adjacent the opposite ends of the respective long side of the housing. The illustrated tape cassette T is provided with lid members 13a and 13b which are mounted to pivot relative to housing 1 about respective pivotaxes disposed adjacent the corners of rectangular housing 1 which are at opposite ends of the long open side of the housing, and which are spring-biased to their closed positions shown on FIG. 1. The pivoting axes of lid members 13a and 13b are perpendicular to the planes of top and bottom walls 1a and 1b for permitting swinging movements of the lid members in directions parallel to the planes of the top and bottom walls between closed positions, shown by solid lines on FIG. 2, in which lid members 13a and 13b extend along at least part of the open long side of the housing for covering or protecting at least a respective part of the tape in run 3a, and opened positions, shown by dot-dash lines on FIG. 2, in which lid members 13a and 13b are displaced from the opening 2 for permitting the withdrawal of the tape through such opening by suitable tape withdrawing means (not shown) which initially extend into cutouts 12a and 12b. Preferably, as shown, lid members 13a and 13b are dimensioned to at least extend across cutouts 12 and 12b in the top and bottom walls 1a and 1b when the lid members are in their closed positions.

In order to prevent accidental erasing of recorded information signals on the magnetic tape, the cassette housing 1 may be further provided with accidental erasing protecting members 15a and 15b (FIG. 1) which are slidably disposed in respective recesses 16a and 16b formed in the corners of housing 1 at the opposite ends of its back wall 1d. The members 15a and 15b are movable between first positions in which they substantially fill recesses 16a and 16b and are engageable by a detecting member (not shown) of a recording and/or reproducing apparatus to permit the establishment of the recording mode of operation of the latter, and second or depressed positions to which the detecting member responds by preventing the establishment of the recording mode of operation.

If desired, as shown on FIGS. 1 and 2, a plurality of holes 17 may be provided in back wall 1d adjacent the opposite ends thereof and in top and bottom walls 1a and 1b adjacent back wall 1d, with each of such holes 17 having a breakable tab 18 therein which can be selectively removed. The presence or absence of the tabs 18 may be detected by suitable detecting levers (not shown) of the recording and/or reproducing apparatus for automatically establishing the correct tape transporting speed and/or the correct equalization and bias current for the magnetic material of the tape 3.

In accordance with the present invention, a tape cassette, for example, as described specifically above, is provided with a brake assembly 20 (FIG. 2) which is engaged when the cassette is not in use, and which is operative in such engaged condition to securely hold the reels 4a and 4b against rotation in the directions for unwinding the tape 3 therefrom, while permitting substantially free rotation of each of the reels independently of the other in the direction for rewinding the tape on the reel. In the illustrated embodiment of the invention, the brake assembly 20 is shown to comprise support members in the form of levers 21 and 22 provided, intermediate their respective ends, with holes 25 and 26 (FIG. 4) which respectively receive a pivot pin 23 depending from top wall 1a and a pivot pin 24 projecting upwardly from bottom wall 1b (FIGS. 2 and 5–8). Thus, levers 21 and 22 are respectively pivoted on pins 23 and 24 which are shown to be laterally spaced apart adjacent back wall 1d of the cassette housing so that levers 21 and 22 extend substantially laterally within cassette housing 1 in back of reels 4b and 4a, respectively.

Figure 5:
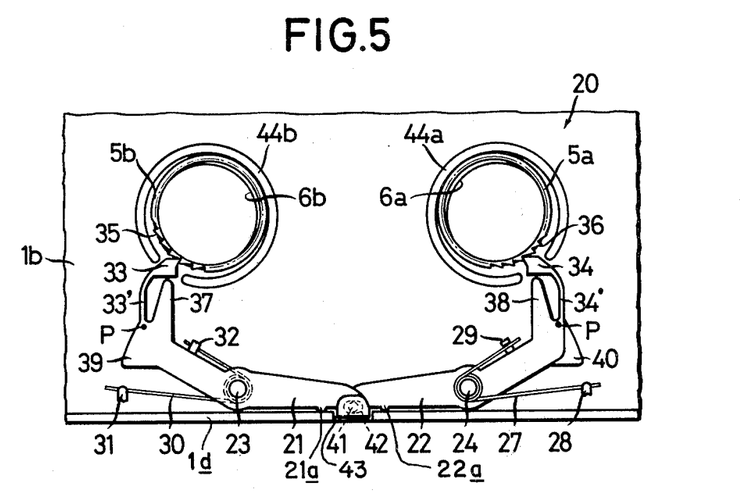
FIGS. 5 to 8 are fragmentary plan views, which are partially broken away, and which illustrate various operations of the braking means according to this invention.
Figure 6:
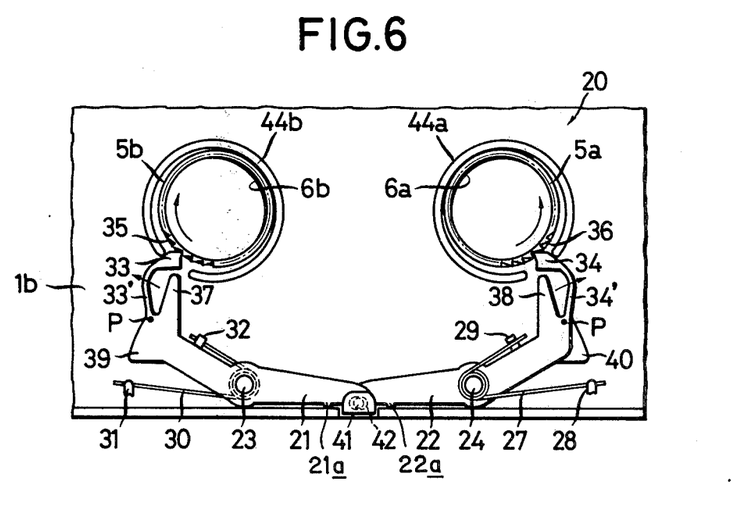
Figure 7:
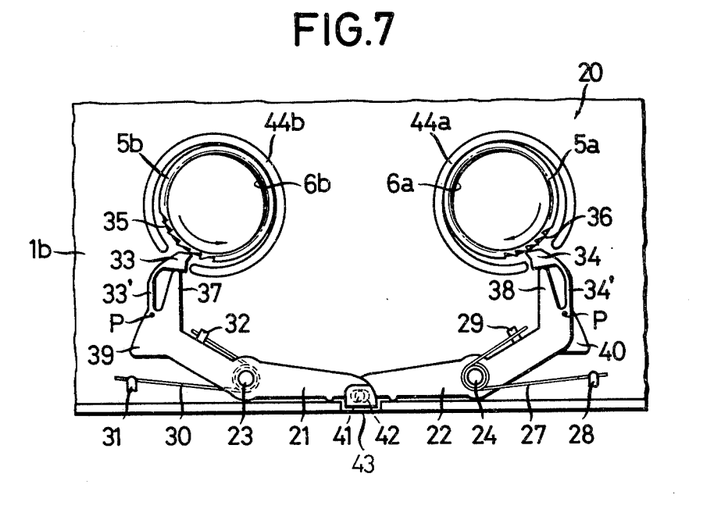

The lever 22 constituting part of the braking means for supply reel 4a is provided with a torsion spring 27 extending around pivot pin 24 and having its opposite end portions engaged with a tab 28 on bottom wall 1b and a tab 29 on lever 22 for urging the latter in the counterclockwise direction, as viewed on FIGS. 3 and 5. Similarly, the lever 21 constituting part of the braking means for takeup reel 4b is provided with a torsion spring 30 extending around pivot pin 23 and having its opposite end portions engaged with a tab 31 formed on the top wall 1a and a tab 32 formed on lever 21 for urging the latter in the clockwise direction.

The braking means for the reels 4b and 4a further respectively include hooks or pawl-like members 33 and 34 which are mounted on levers 21 and 22 means of flexibly resilient mounting members 33' and 34' directed forwardly from the laterally outer ends of levers 21 and 22, respectively. Preferably, as shown, the lever 21, pawl-like member 33 and mounting member 33' are formed as integral parts of a onepiece molded plastic element, with the mounting member 33' being in the form of a relatively thin web-like part so as to be resiliently flexible. Similarly, lever 22, pawl-like member 34 and mounting member 34' are preferably formed as integral parts of a one-piece molded plastic element with mounting member 34' being in the form of a relatively thin web-like part so as to be resiliently flexible.

The pawl-like members 33 and 34 on levers 21 and 22 are respectively engageable with serrated gears 35 and 36 which are formed on the outer peripheries of the upper and lower end portions of hubs 5b and 5a, respectively. Each of the serrated gears 35 and 36 is constituted by a circular series of raked teeth which define respective substantially radially directed surfaces facing in the direction of rotation of the respective reel for unwinding the tape therefrom. Thus, in the case of the illustrated cassette T, the substantially radially directed surfaces of the raked teeth of serrated gear 35 face in the clockwise direction, that is, in the direction for unwinding the tape from reel 4b, while the substantially radially directed surfaces of the serrated gear 36 face in the counter-clockwise direction which is the direction of rotation of the reel 4a for unwinding the tape 3 therefrom.

The levers 21 and 22 are further shown to have projections 37 and 38 directed forwardly from the laterally outer ends of levers 21 and 22, respectively. The projections 37 and 38 are shown to extend inwardly with respect to the web-like 33' and 34', respectively, and are dimensioned so that the forward ends of projections 37 and 38 are normally spaced by small distances from rearwardly facing surfaces of the pawl-like members 33 and 34, respectively. The laterally outer ends of levers 21 and 22 are further shown to be formed with guiding nose portions 39 and 40, respectively, which have curved outer edges adapted to be slidably received in guide notches defined by undercut end portions of the ribs formed at the underside of top wall 1a and on bottom wall 1b, respectively. Thus, for example, as shown on FIG. 3, the curved outer edge of nose portion 40 on lever 22 is slidably guided in a notch or undercut 40a at an end of one of the ribs 1b' formed on bottom wall 1b of the cassette housing.

The laterally inner ends of levers 21 and 22 are shown to be in adjacent, superposed relation and coupled together, for example, by a pin 41 directed upwardly from the inner end of lever 22 and being received in a downwardly opening, laterally elongated recess 42 formed in the inner end portion of lever 21. The coupled-together inner ends of levers 21 and 22 are shown to be exposed at an opening or window 43 which is substantially centrally located in the back wall 1d of the cassette housing. Further, the inner end portions of levers 21 and 22 are formed with rearwardly directed nodes 21a and 22a, respectively, engageable with back wall 1d for limiting the pivotal movements of levers 21 and 22 under the urging of the respective springs 30 and 27.

As shown on FIGS. 3 and 5–8, an annular flange 44a extends upwardly from bottom wall 1b of the cassette housing about the respective opening 6a in such bottom wall so as to extend around the series of raked teeth 36 on the lower end of the hub of reel 4a, and such flange 44a is formed with a gap through which the respective pawl-like member 34 is movable radially in respect to reel 4a into and out of engagement with the raked teeth 36. Similarly, an annular flange 44b is directed downwardly from top wall 1a of the cassette housing about the respective opening 6b so as to extend around the series of raked teeth 35 on the hub of reel 4b, and such flange 44b is formed with a gap through which the respective pawl-like member 33 is movable radially in respect to reel 4b into and out of engagement with the raked teeth 35.

The operation of the brake assembly 20 according to this invention will now be described with reference to FIGS. 5–8.

When the tape cassette T is not in use, levers 21 and 22 are relatively strongly urged by the springs 30 and 27, respectively, to their engaged positions (FIG. 5) in which nodes 21a and 22a abut against back wall 1d of the cassette housing and pawl-like members 33 and 34 extend through the gaps in flanges 44b and 44a into engagement with the raked teeth 35 and 36, respectively. With levers 21 and 22 in such engaged positions, turning of hub 5a of supply reel 4a in its tape-unwinding direction, as indicated by the arrow on FIG. 6, causes the substantially radially directed surface of one of the raked teeth 36 on hub 5a to act against the respective pawl-like member 34 for causing angular displacement of the latter relative to lever 22 in the clockwise direction about the pivot point indicated at P. Although the clockwise angular displacement of pawl-like member 34 is only lightly resisted by the resiliently flexible, thin web-like part 34' mounting pawl-like member 34 on lever 22, such angular displacement of pawl-like member 34 is restricted severely by its engagement with the adjacent edge of the gap in flange 44a which thus acts as an abutment to block the angular displacement of pawl-like member 34 relative to lever 22 when the supply reel 4a is urged to rotate in the direction for unwinding the tape therefrom. Similarly, if hub 5b of the takeup reel 4b is turned in its tape-unwinding direction, as indicated by the arrow on FIG. 6, the substantially radially directed surface of one of the respective raked teeth 35 acts against the pawl-like member 33 so as to urge the latter to be angularly displaced in the counter-clockwise direction about the pivot point P on lever 21 against the relatively light resistance of the flexibly resilient, thin web-like part 33', but such angular displacement of pawl-like member 33 is severely restricted by its engagement against an adjacent edge of the gap in flange 44b. It will be apparent from the foregoing that, with levers 21 and 22 in their engaged positions, reels 4a and 4b are positively locked against rotational movements in their respective tape-unwinding directions by the engagement of the pawl-like members 33 and 34 against edges of the gaps in flanges 44b and 44a, respectively. The strength of such locking action is not dependent on the force of springs 30 and 27 which are merely relied upon for moving or urging levers 21 and 22 to their engaged positions.

Figure 8:
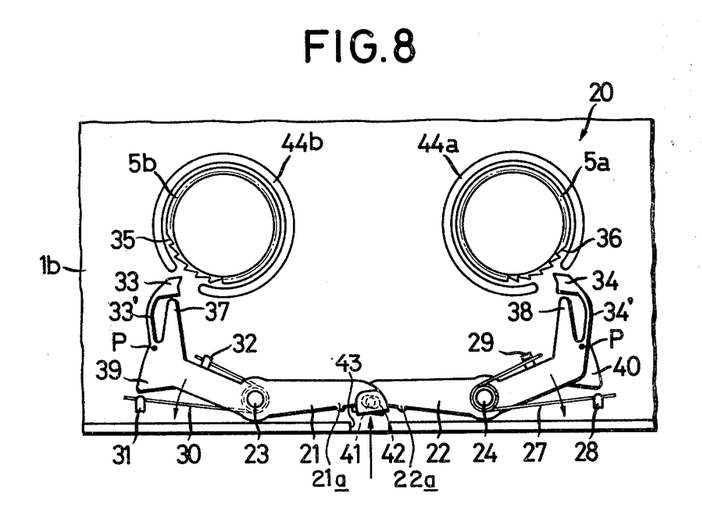

When the tape cassette T according to this invention is installed or loaded in a recording and/or reproducing apparatus, a brake releasing member (not shown) of such apparatus is inserted in opening 43 in back wall 1d of the cassette housing so as to displace the coupled together inner ends of levers 21 and 22 in the direction of the arrow on FIG. 8. Thus, levers 21 and 22 are pivoted in the directions of the arrows shown on FIG. 8 against the forces of the springs 30 and 27 to the illustrated disengaged positions in which pawl-like members 33 and 34 are withdrawn radially from engagement with the raked teeth 35 and 36, respectively, so as to free the takeup and supply reels for rotation without resistance from brake assembly 20.

When the tape cassette T is removed from the magnetic and/or reproducing apparatus, springs 30 and 27 are effective to return levers 21 and 22 to their engaged positions (FIG. 5) in which pawl-like members 33 and 34 again engage raked teeth 35 and 36, respectively. It will be noted that, during such return movement of levers 21 and 22 to their engaged positions, pawl-like members 33 and 34 move substantially radially in respect to hubs 5b and 5a and, therefore, the reengagement of pawl-like members 33 and 34 with teeth 35 and 36 does not impart any turning movements to the respective hubs 5b and 5a in the tape-unwinding directions of the latter.

If the tape wound on reels 4a and 4b is in a loosened condition when the tape cassette T has been removed from the recording and/or reproducing apparatus, the brake assembly 20 according to this invention permits the substantially free rotation of such reels in the directions for rewinding the tape thereon even though levers 21 and 22 are then in their engaged positions. In this connection, reference to FIG. 7 will show that, with levers 21 and 22 being held in their engaged positions by springs 30 and 27, turning of hub 5a in the clockwise direction, as indicated by the arrow thereon, for rewinding the tape on the reel 4a causes the raked or sloping surfaces of teeth 36 to move past the respective pawl-like member 34. During such movement of the raked teeth 36 past pawl-like member 34, the latter is periodically angularly displaced with accompanying flexing of the respective thin, web-like part 34' which only lightly resists such angular displacement of pawl-like member 34. Thus, although the spring 27 for urging lever 22 to its engaged position may be relatively strong, such relatively strong spring force does not need to be overcome in turning hub 5a in the direction for rewinding the tape on reel 4a with the result that such rewinding of the tape can be easily accomplished manually through the openings 6a in the cassette housing. Similarly, hub 5b or reel 4b can be substantially freely turned in the counter-clockwise direction, as indicated by the arrow on FIG. 7, that is, in the direction for rewinding the tape on reel 4b. During such turning of hub 5b, the associated raked teeth 35 slide past pawl-like member 33 which is periodically angularly displaced against only the relatively light resistance of the thin, web-like part 33'. It will be seen that the projections 37 and 38 limit the angular displacements of the respective pawl-like members 33 and 34 that result from rotations of the reels 4b and 4a in their tape-rewinding directions. After the hub 5a and/or 5b has been turned in the direction for rewinding the tape on the respective reel, the resiliently flexible web-like parts 33' and 34' return the respective pawl-like members 33 and 34 to the positions shown on FIG. 5, that is, so as to lock the reels against rotation in their tape-unwinding directions, as explained above with reference to FIG. 6.

It will be apparent from the above that the brake assembly 20 according to this invention is effective, when the associated tape cassette T is not in use, to positively lock the takeup and supply reels against rotation in their respective tape-unwinding directions, while permitting substantially free rotation of the reels in the directions for rewinding the tape thereon. Further, although the levers 21 and 22 are coupled together so as to be actuable to their disengaged positions by a single brake releasing member, as described above with reference to FIG. 8, the coupling together of levers 21 and 22 does not interfere with the individual turning of one of the reels 4a and 4b in its tape-rewinding direction when the tape cassette is not in use. In other words, when hub 5a is turned in the direction for rewinding the tape on the respective reel 4a, as described above with reference to FIG. 7, the angular displacement of pawl-like member 34 relative to lever 22 resulting from the sliding of raked teeth 36 past member 34 does not cause any movement of lever 22 from its engaged position and, therefore, lever 21 remains in its engaged position with the result that the respective pawl-like member 33 continues to engage teeth 35 so as to prevent turning of the respective reel 4b in its tape-unwinding direction.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention, as defined in the appended claims.

What is claimed is:

1. A tape cassette comprising: a housing; at least one reel rotatably disposed in said housing and having a circular series of raked teeth which define respective substantially radially directed surfaces facing in one of the directions of rotation of the reel; a supply of tape wound on said reel so as to be unwound from the latter upon rotation of the reel in said one direction and rewound on the reel upon rotation of the latter in the opposite direction; and braking means for each said reel including a support member movable in said housing between an engaged position and a disengaged position, a pawl-like member carried by said support member to be positioned against said raked teeth of the respective reel in said engaged position of the support member and being spaced from said raked teeth in said disengaged position, means mounting said pawl-like member for angular displacement in respect to said support member so that, with the latter in said engaged position, rotation of said respective reel in said opposite direction for rewinding the tape thereon causes said raked teeth to move past said pawl-like member as the latter is angularly displaced in one direction relative to said support member to substantially free the reel for said rotation in said opposite direction thereof, whereas rotation of said respective reel in said one direction for unwinding the tape therefrom brings one of said substantially radially directed surfaces of the raked teeth against said pawl-like member so as to urge the latter to be angularly displaced in the opposite direction relative to said support member, and abutment means engageable by said pawl-like member in said engaged position of the support member for blocking said angular displacement of said pawl-like member in said opposite direction relative to said support member and thereby preventing the unwinding of the tape from said reel.

2. A tape cassette according to claim 1; in which said abutment means is fixed in said housing adjacent to said series of raked teeth on said reel.

3. A tape cassette according to claim 1; in which said braking means further includes spring means yieldably urging said support member to said engaged position, and said housing has an opening at which a portion of said support member is accessible from the exterior of the housing for actuation of said support member to said disengaged position against the force of said spring means.

4. A tape cassette according to claim 1; in which said means mounting the pawl-like member for angular displacement in respect to said angular displacement of the pawl-like member from a rest position relative to said support member.

5. A tape cassette according to claim 4; in which said support member and said pawl-like member are integral parts of a one-piece molded plastic element, and said means mounting the pawl-like member is constituted by a web-like part of said one-piece molded plastic element which is relativey thin so as to be resiliently flexible.

6. A tape cassette according to claim 1; in which said support member is in the form of a lever pivotally mounted in said housing and having said pawl-like member extending from one end of said lever for movement in a path that is substantially radially directed in respect to said reel in response to pivotal movement of said lever between said engaged and disengaged positions of said support member, and said abutment means is fixed in said housing adjacent said series of raked teeth on the reel at the side of said substantially radially directed path facing in said one directon of rotation of the reel.

7. A tape cassette according to claim 6, in which said lever and said pawl-like member are integral parts of a one-piece molded plastic element, and said means mounting the pawl-like member is constituted by a web-like part as said one-piece element extendng between said one end of the lever and said pawl-like member and being relatively thin so as to be resiliently flexible for permitting said angular displacement.

8. A tape cassette according to claim 7; in which said one-piece plastic element further includes a rigid projection extending from said one end of the lever adjacent to said pawl-like member for limiting said angular displacement of the latter in said one direction.

9. A tape cassette according to claim 6; in which said lever is pivotally mounted intermediate its ends, said braking means further includes spring means yieldably urging said lever to pivot in the direction for movement to said engaged position, and said housing has an opening at which the other end of said lever is accessible from the exterior of the housing and can be actuated for pivoting said lever to said disengaged position.

10. A tape cassette according to claim 1; further comprising a second reel rotatably disposed in said housing in side-by-side relation to said one reel with said tape being also wound on said second reel and extending between the latter and said one reel, said second reel also having a series of raked teeth which define respective substantially radially directed surfaces facing in the direction of rotation of said second reel for the unwinding of the tape therefrom; and in which the said braking means for said second reel is also operative, when the respective support member is in said engaged position thereof, to permit said second reel to be substantially freely rotated in the direction for rewinding the tape thereon and to prevent the rotation of said second reel in said direction for the unwinding of the tape from said second reel.

11. A tape cassette according to claim 10; in which each of said braking means further includes spring means yieldably urging the respective support member to said engaged position thereof, and said housing has an opening at which a portion of said support member of each braking means is accessible from the exterior of the housing for actuation of the respective support member to its said disengaged position against the force of the respective spring means.

12. A tape cassette according to claim 11; in which the support members of said braking means associated with said one reel and said second reel, respectively are constituted by laterally extending first and second levers pivotally mounted, intermediate their ends in, said housing and having adjacent ends which are coupled together and exposed at said opening of the housing, and said means mounting the pawl-like members are constituted by resiliently flexible web-like members extending from the opposite remote ends of said levers substantially at right angles to the latter.

13. A tape cassette according to claim 12; in which said lever, pawl-like member and resiliently flexible web-like member of each of said braking means are constituted by respective integral parts of a one-piece molded plastic element.

14. A tape cassette according to claim 10; in which each of said reels includes a hub with the respective series of raked teeth extending from said hub adjacent one end thereof, and a radial flange extending from the other end of the hub for guiding the tape wound thereon; and in which said reels are arranged with the respective flanges at opposed ends of the reels and in partly overlapping relation to each other.

15. A tape cassette comprising: a housing; first and second reels rotatably disposed in side-by-side relation in said housing; a supply of tape wound on said reels and extending between the latter; a circular series of raked teeth on each of said reels defining respective substantially radially directed surfaces facing in the direction of rotation of the respective reel for unwinding of the tape therefrom; and first and second braking means for said first and second reels, respectively, and including first and second support members which are coupled together for movement jointly in said housing between respective engaged positions and disengaged positions, each of said first and second braking means further including a pawl-like member, resiliently flexible means mounting said pawl-like member on the respective one of said support members to cause said pawl-like member to be positioned against said raked teeth of the respective reel in said engaged position of said respective support member and permitting angular displacement of said pawl-like member relative to said respective support member for skipping movement of the respective raked teeth past said pawl-like member in response to rotation of said respective reel in the direction for rewinding the tape thereon so as to substantially free said respective reel for rotation in said rewinding direction with said respective support member in its engage position, whereas rotation of each reel in said direction for unwinding the tape therefrom brings one of said substantially radially directed surfaces of the respective raked teeth against said pawl-like member of the respective braking means, and abutment means engageableby said pawl-like member for blocking angular displacement of said pawl-like member relative to said respective support member under the urging of said one radially directed surface of the respective raked teeth so as to positively prevent the rotation of the respective reel in said tape unwinding direction.

16. A tape cassette according to claim 15; in which said housing is substantially rectangular, said reels have their respective axes spaced apart in the lateral direction of the housing, said housing has an opening at the front thereof through which the tape extending between the reels can be withdrawn from the housing, said first and second support members are constituted by first and second levers, respectively, extending laterally in said housing in back of said first and second reels, each of said levers is pivotally mounted intermediate its ends in respect to said housing with the laterally inner ends of said levers being adjacent each other and having interengaging elements for the coupling together of said support members, and said resiliently flexible means mounting each pawl-like member extends generally forwardly from the laterally outer end of the respective lever so as to move the respective pawl-like member generally radially in respect to the axis of the respective reel for engagement and disengagement with the respective raked teeth in response to pivotal movement of the respective lever between its engaged and disengaged positions respectively.

17. A tape cassette according to claim 16; in which said housing has an opening at the back thereof through which said adjacent, laterally inner ends of the levers are accessible for actuation of said levers to said disengaged positions thereof, and spring means are provided to urge said levers to said engaged positions thereof.

18. A tape cassette according to claim 16; in which said abutment means for each of said braking means includes an annular flange in said housing extending around said series of raked teeth on the respective reel and having a gap through which the respective pawl-like member is radially movable into and out of engagement with said raked teeth, with said pawl-like member engaging an edge of said gap in the flange for said blocking of its angular displacement under the urging of a radially directed surface of said raked teeth.

19. A tape cassette according to claim 16; in which said lever, pawl-like member and resiliently flexible mounting means of each of said braking means are integral parts of a one-piece molded plastic element, with said resiliently flexible mounting means being constituted by a relatively thin web-like portion of said element extending between said lever and said pawl-like member.

* * * * *